March 7, 1961  FUMIO TANIGUCHI  2,974,214
ELECTRICAL APPLIANCE AND SUPPORT MEANS THEREFOR
Filed Sept. 9, 1958  2 Sheets-Sheet 1

INVENTOR.
FUMIO TANIGUCHI
BY Kurt Kelman
HIS AGENT

March 7, 1961　　　FUMIO TANIGUCHI　　　2,974,214
ELECTRICAL APPLIANCE AND SUPPORT MEANS THEREFOR
Filed Sept. 9, 1958　　　　　　　　　　　　2 Sheets-Sheet 2

INVENTOR.
Fumio Taniguchi
BY Kurt Kelman
His Agent

United States Patent Office 2,974,214
Patented Mar. 7, 1961

2,974,214

ELECTRICAL APPLIANCE AND SUPPORT MEANS THEREFOR

Fumio Taniguchi, 2—3, 3-Chome, Ueno Machi, Tajimi City, Japan

Filed Sept. 9, 1958, Ser. No. 760,040

Claims priority, application Japan June 20, 1958

1 Claim. (Cl. 219—43)

This invention relates to electric appliances, and more particularly to an electrically heated water boiling pot which is combined with a shelf-like support adapted to guide the pot into engagement with the outlet of a source of electric current and to support the pot when the latter is disconnected from the current source.

Figure 1:
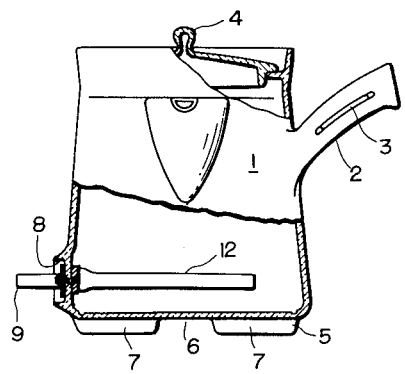
Figure 1 is a side elevational view, partially in section, of an electrically heated water boiling pot.
Figure 2:
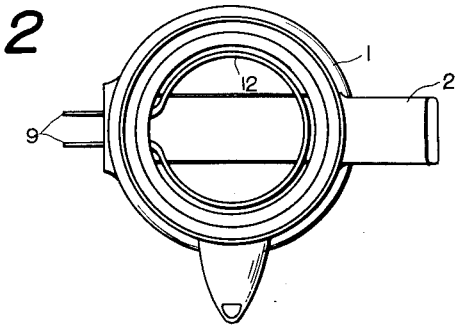
Figure 2 is a top plan view of the pot with the lid removed.
Figure 3:
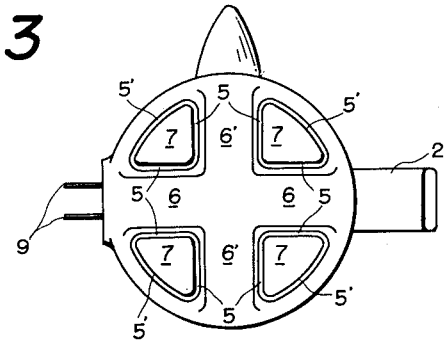
Figure 3 is a bottom plan view of the pot.
Figure 5:
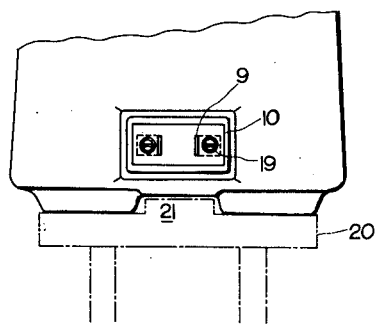
Figure 5 shows the pot and the support in a view as seen from the left-hand side of Fig. 4.
Figure 6:
Figures 6 and 7 show certain components of the plug forming part of the pot.

In Figures 1, 2 and 3 of the drawings, there is shown an electrical appliance in the form of a water boiling pot having a handle 2 formed with a slit 3, the handle extending from the upper part at one side of the pot body 1. The lower half of body 1 is formed with a recess 8 which is diametrically opposite the handle 2 and receives the inner ends of two L-shaped flat metallic terminal pins 9 (see Fig. 6) which are intended to connect the pot to a source of electric current, not shown. The underside of the bottom forming part of body 1 is formed with projection receiving recesses or slots 6 and 6'. As is shown in Figure 3, the bottom plate of the pot comprises projections 5 which define the aforementioned slots 6 and 6', the projections 5 forming the slot 6 being tightly engaged with projection 21 of a shelf-like support 20 when the pot is connected to a source of electric current in the manner shown in Fig. 8. When the pot is disconnected from the current source, the pot is turned through 90 degrees whereby the other slot 6' may receive the projection 21. The four arcuate projections 5' extending from the bottom of the pot form with the aforementioned projections 5 two pairs of legs which increase the stability of the pot when the latter is placed onto the support 20.

Figure 4:
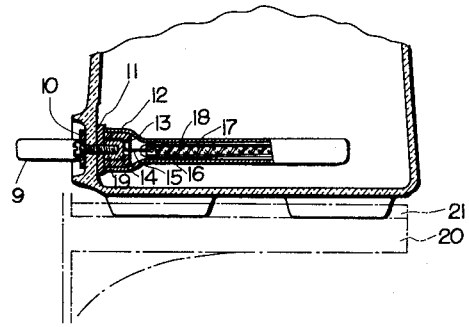
Figure 4 is an enlarged vertical section through the lower part of the pot showing a sheathed electrical heater installed in the pot and further showing in phantom lines a shelf-like support for the pot.
Figure 7:
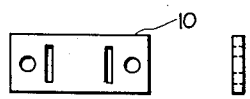

Figure 4 shows the construction of a sheathed electric heater which is installed in the interior of pot body 1. The heating wire 17 consisting of, for instance, Ni-Cr alloy is wound onto the core plate 16 consisting of, for instance, mica, and is surrounded by an arcuate sheath 18 consisting of, for instance, mica. The parts 16—18 are received in an annular seamless metal capsule 12, whereby the capsule 12 is electrically insulated from the wire 17. In order to prevent foreign matter from penetrating into the capsule 12, each of the latter's ends receives a terminal plug 13 of insulating material and each plug 13 receives therewithin a metallic terminal plug 14. Threaded bolts 19 connect each L-shaped pin 9 with one terminal plug 14, the pins 9 being secured by their respective bolts 19 to a plate 10 (see Fig. 7) of insulating material. The ends 15 of heating wire 17 are fixed to the terminal plugs 14.

The distance between L-shaped pins 9 preferably equals ½".

A heat-proof packing 11 made, for instance, of silicon rubber, is inserted between the ends of heater parts 12, 14, 15 and the inner side of pot body 1 opposite the recess 8, and the terminal plugs 14 are held tight by the respective bolts 19 which pass through the terminal plate or board 10, whereby the interior of the sheathed electrical heater is sealed from the interior of body 1 and the terminal plugs 14 are firmly fixed to the elastic packing 11 inwardly of the recess 8. At the same time, the heating wire 17 is insulated from the capsule 12.

Figure 8:
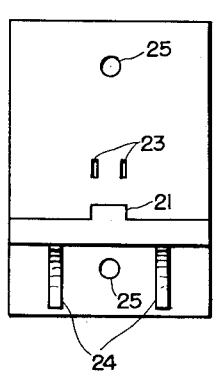
Figure 8 shows in front elevational and sectional views the support for the pot, the latter being indicated in phantom lines in the right-hand half of this illustration.

The shelf-like support 20 shown in Fig. 8 is L-shaped; it comprises a horizontal plate member having at its upper side the aforementioned projection 21 and a vertical plate member 22 having slits or apertures 23 which permit the passage of L-shaped pins 9. The underside of the horizontal plate member forming part of support 20 is connected with downwardly extending stiffeners 24.

The important feature of my invention resides in the provision of projections 5 and 5', and in the provision of slots 6 and 6' at the bottom of the pot body 1, as well as in the provision of projection or rib 21 on the support 20.

In using the pot of this invention, the cover of an electric outlet is first taken off and the support 20 is affixed to the wall which surrounds the outlet.

The distance between the openings 25 through which the non-represented screws for fixing the support 20 to a wall of the like are passed should be in accord with U.S. standards. After the pot is filled with water, slot 6 of body 1 receives the rib or projection 21 of the support 20, and the pot body is slowly moved toward the member 22 by the handle 2 whereby the L-shaped pins 9 enter into and pass through the apertures 23 to enter into the non-represented outlet to connect the heater with the current source. The horizontal component of the force exerted upon the handle 2 causes the L-shaped pins 9 to enter into or be withdrawn from the slots 23.

When the water or another substance inside the pot is boiled, the L-shaped pins 9 can be separated from apertures 23 by slowly pulling the handle 2 in a direction away from the member 22. The slit 3 provided in the handle 2 serves to prevent heat transfer from the pot body 1 to a user's hand. The slot 6' at the underside of body 1 can receive the projection 21 of the device 20. Thus, the latter may serve as a support for the pot regardless of whether the pot is connected with or disconnected from the current source.

I claim:

The combination of an electric appliance having a body formed with handle means at one side thereof, a pair of parallel horizontal terminal pins extending from the other side thereof, and a bottom plate formed with a pair of intersecting recesses one of which is aligned with said terminal pins; with a support comprising a horizontal plate member having an upper side and formed with a rib extending above said upper side and receivable in each of said recesses, and a vertical plate member extending upwardly from the horizontal plate member and having a pair of apertures for receiving said terminal pins when the rib is received in said one recess and the body of said appliance is moved by its handle toward said vertical plate member, the other recess being adapted to receive said rib when the terminal pins are withdrawn from said apertures and the appliance is placed onto the horizontal plate member of said support.

References Cited in the file of this patent

UNITED STATES PATENTS

| | | |
|---|---|---|
| 2,286,340 | Bulpitt | June 16, 1942 |
| 2,450,336 | Hall | Sept. 28, 1948 |
| 2,640,968 | Lehr | June 2, 1953 |